Feb. 14, 1928.
D. E. GAMBLE
CLUTCH PLATE
Filed June 27, 1927
1,659,289
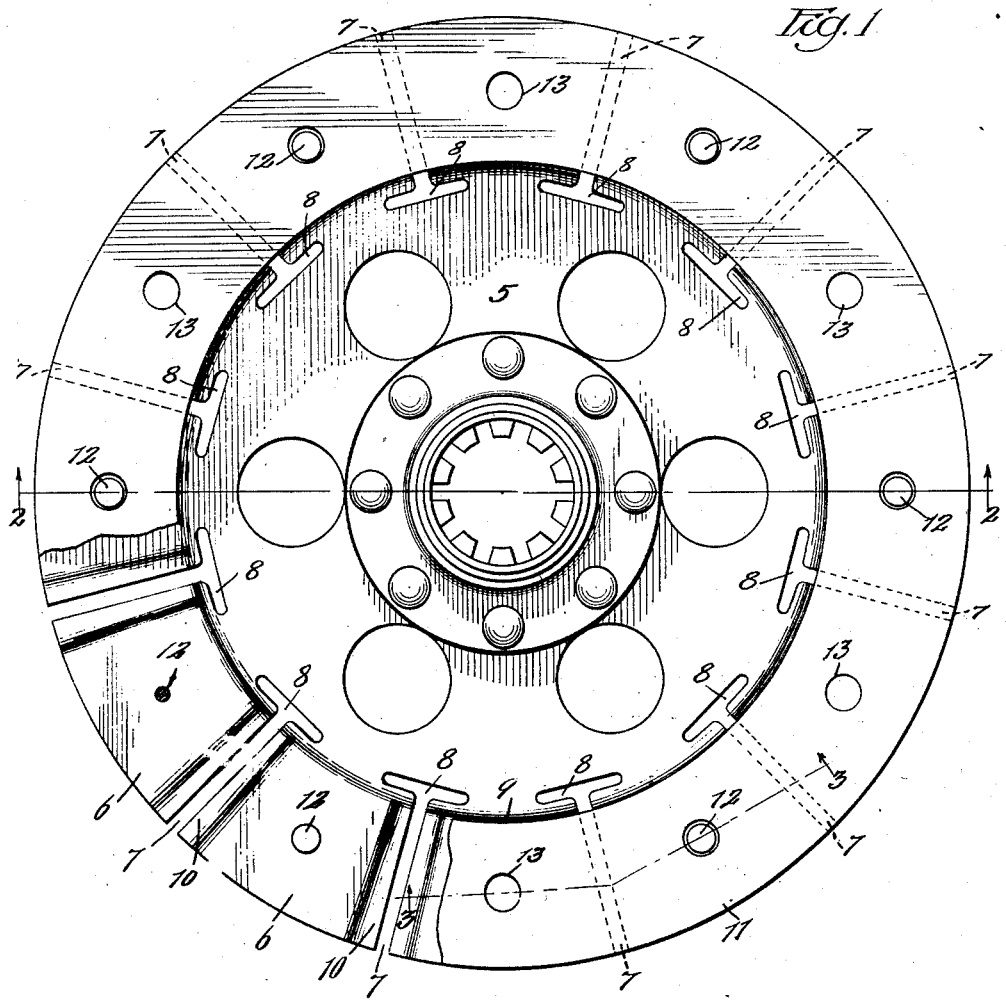
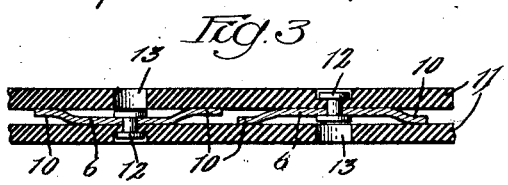
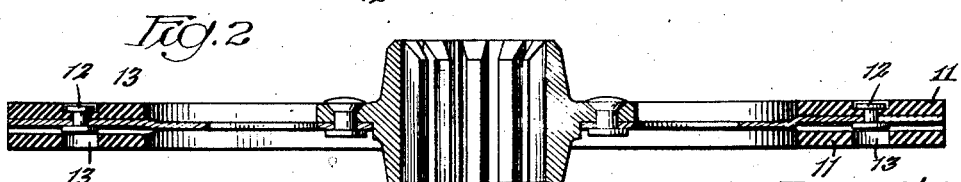
Inventor
David E. Gamble
By Wm O. Belt Atty Patented Feb. 14, 1928.

1,659,289

UNITED STATES PATENT OFFICE.

DAVID E. GAMBLE, OF DETROIT, MICHIGAN, ASSIGNOR TO THE BORG & BECK COMPANY, OF CHICAGO, ILLINOIS, A CORPORATION OF ILLINOIS.

CLUTCH PLATE.

Application filed June 27, 1927. Serial No. 201,575.

This invention relates to friction clutches of the kind wherein a friction plate is interposed between two parts of a driving member and is adapted to be gripped or clamped by the parts under sufficient pressure to impart motion from the driving member to the driven member of the clutch. The invention is particularly desirable in a friction clutch for automotive vehicles.

The object of the invention is to provide a novel clutch plate having friction rings which will take hold smoothly and evenly throughout their contact area when pressure is initially applied, and by a yielding but rapid progressive action make the clutch act quickly and efficiently without grabbing or jerking.

Another object of the invention is to provide a clutch plate with continuous friction rings and to make full engagement between the friction rings and the driving members throughout the application of pressure, whereby to secure maximum efficiency in a rapid progressive movement and without uneven wear on the rings.

And a further object of the invention is to provide the clutch plate with integral supports of novel construction for the friction rings and which supports are adapted to yield under clutch pressure in a uniform progressive manner to provide a soft clutch action.

In the accompanying drawings I have illustrated a selected embodiment of the invention and referring thereto:

Fig. 1 is a side elevation of the clutch plate showing one of the friction rings partly broken away.

Fig. 2 is a transverse sectional view on the line 2—2 of Fig. 1.

Fig. 3 is a detail sectional view on the line 3—3 of Fig. 1.

In the drawings the clutch plate 5 is divided into a plurality of sectors 6 by radial slots 7 which extend through the periphery of the plate and connect at their inner ends with transverse slots 8 at or about the middle thereof. These slots 8 are spaced apart and are disposed substantially normal to the slots 7 to form therewith T-shaped slots which separate the sectors.

Alternate sectors are bent bodily and laterally of the plate to offset positions on opposite sides of the plate from a concentric line 9 located outside of the slots 8 so that the offset sectors on one side of the plate will be so spaced relative to the offset sectors on the other side of the plate that substantial pressure is required to flatten sectors to the same plane as the body of the plate.

The marginal edge portions 10 of each sector, extending along the slots 7, are bent oppositely to the offset bend of the sector to lie normally in a plane with the body portion of adjacent sectors. By this construction the marginal portions 10 of one sector will be offset on one side of the plane of the body of the plate and the intermediate body portion of the sector will be offset on the other side of the plane of the body of the plate, so that the marginal portions of one sector will lie in a plane of the body portions of adjacent sectors and, since the body portions of alternate sectors are offset to opposite sides of the plane of the body of the plate, the marginal portions of each sector will be offset to the opposite side of the plane of the body of the plate from the body of the sector.

Continuous friction rings 11, which are preferably made of hard solid material, are arranged on opposite sides of the plate and are fastened by rivets 12, or other suitable fastening means, to the body portion, at or about the middle thereof, of alternate sectors with which they engage. Each ring is provided with openings 13 opposite the rivets with which said ring is not engaged to accommodate the heads of the rivets and permit the ring to flatly engage the sector which carries the rivets. Thus one ring is fastened to alternate sectors on one side of the plate and the other ring is fastened to the other sectors on the other side of the plate, and in released position of the clutch these rings are spaced apart, as shown in Fig. 3. In released position of the clutch the body portion of one sector engages one ring and the side marginal portions of this sector engage the other ring, and since the body portions of adjacent sectors engage opposite rings and the marginal portions of adjacent sectors engage opposite rings from those engaged by the body portions of the respective sectors, the sectors constitute a yielding support for the rings which is sectional in construction, but so nearly continuous in action that the rings will engage the driving and driven members of the clutch smoothly, evenly and uniformly throughout their entire length.

The invention provides a clutch plate of simple and novel construction which will cause a clutch to take hold smoothly and evenly and without grabbing or jerking. The sectors provide a yielding sectional support for continuous rings which operates to all intents and purposes as a continuous independent support for each sector, but which is constructed to yield uniformly and progressively, to provide a clutch which acts quickly but softly. Each friction ring is caused to make full engagement with its clutch member and this prevents uneven wear of the ring and prolongs the life of the ring. Each slot 8 is located opposite the inner ends of the marginal portions 10 of two adjacent sectors, and this enables these bent offset marginal portions to yield and flatten out transversely of the sector at the same time that the body of the sector is yielding and flattening out radially of the plate, whereby the sectors collectively constitute a substantial and uniform, but sectionally yielding support for the rings which will engage the clutch members throughout their contact faces and yield evenly and progressively in a quick and efficient clutch action.

I claim:

1. A clutch plate having a plurality of radial slots extending inward from its periphery to provide a plurality of spaced sectors, said sectors being bodily and laterally offset alternately on opposite sides of the plate, and continuous friction rings on opposite sides of said plate and connected to alternate sectors.

2. A clutch plate having a plurality of radial slots extending inward from its periphery to provide a plurality of spaced sectors, said slots having T-shaped heads at their inner ends and said sectors being bodily and laterally offset alternately on opposite sides of the plate, and continuous friction rings on opposite sides of said plate and connected to alternate sectors.

3. A clutch plate having a plurality of radial slots extending inward from its periphery to provide a plurality of spaced sectors, said sectors being bodily and laterally offset alternately on opposite sides of the plate on a line concentric of the plate located at or about the inner ends of the sectors, and continuous friction rings on opposite sides of said plate and connected to alternate sectors.

4. A clutch plate having a plurality of radial slots extending inward from its periphery to provide a plurality of spaced sectors, the side marginal portions of each sector being offset in one direction and the intermediate body portion of the sector being offset in the opposite direction.

5. A clutch plate having a plurality of radial slots extending inward from its periphery to provide a plurality of spaced sectors, said sectors being bodily and laterally offset alternately on opposite sides of the plate and the side marginal portions of each sector being offset oppositely to its intermediate body portion.

6. A clutch plate having a plurality of radial slots extending inward from its periphery to provide a plurality of spaced sectors, the side marginal portions of each sector being offset in one direction and the intermediate body portion being offset in the other direction from the plane of the body of the plate, there being transverse slots connected to the inner ends of the radial slots and projecting concentrically of the plate opposite the inner ends of said marginal portions, and continuous friction rings on opposite sides of said plate and connected to alternate sectors.

7. A clutch plate having a plurality of radial slots extending inward from its periphery to provide a plurality of spaced sectors, the inner ends of said slots connecting with transverse slots at or about the middle thereof, the body portion of each sector being offset laterally to one side of the plane of the body of the plate and the side marginal portions of said sector being offset to the other side of the plane of the body of the plate, adjacent sectors being oppositely offset, and continuous friction rings on opposite sides of said plate and connected to alternate sectors.

DAVID E. GAMBLE.